United States Patent [19]
Mooneyham

[11] Patent Number: 5,677,834
[45] Date of Patent: Oct. 14, 1997

[54] METHOD AND APPARATUS FOR COMPUTER ASSISTED SORTING OF PARCELS

[76] Inventor: Martin Mooneyham, 26 Dalewood, Searcy, Ark. 72143

[21] Appl. No.: 378,463

[22] Filed: Jan. 26, 1995

[51] Int. Cl.$^6$ .................................................. G05B 19/00
[52] U.S. Cl. ........................................ 364/188; 364/478
[58] Field of Search ........................... 364/708.1, 188, 364/189; 235/61.11, 467, 472, 462; 401/7; 209/3.3, 584, 546; 395/2; 434/166; 198/365

[56] References Cited

U.S. PATENT DOCUMENTS

| | | | |
|---|---|---|---|
| 343,391 | 6/1886 | Peiter | 401/8 |
| 3,796,862 | 3/1974 | Asija | 235/61.11 E |
| 3,887,286 | 6/1975 | Bucey | 401/7 |
| 4,509,635 | 4/1985 | Emsley et al. | 198/365 |
| 4,556,944 | 12/1985 | Daniel et al. | 364/466 |
| 4,832,204 | 5/1989 | Handy et al. | 209/3.3 |
| 4,846,710 | 7/1989 | Campbell | 434/166 |
| 4,921,107 | 5/1990 | Hofer | 209/546 |
| 5,208,449 | 5/1993 | Eastman et al. | 235/462 |
| 5,247,162 | 9/1993 | Swartz et al. | 235/467 |
| 5,263,118 | 11/1993 | Cornelison | 395/2 |
| 5,305,244 | 4/1994 | Newman et al. | 364/708.1 |
| 5,314,260 | 5/1994 | Andersson | 401/7 |
| 5,340,972 | 8/1994 | Sandor | 235/472 |

*Primary Examiner*—Paul P. Gordon
*Assistant Examiner*—Y. Kundupoglu

[57] ABSTRACT

A method and apparatus for sorting parcels using a portable computer worn by the user and equipped with voice recognition systems and voice synthesis systems. The portable computer is carried on the body of the user, who wears a headset having at least one microphone and at least one speaker electrically connected to the voice synthesis and voice recognition systems of the portable computer. Address information spoken by the user is recognized and sorting information provided to the user. In an alternative embodiment, the invention also comprises laser scanning means. In a further alternative embodiment, means are provided for marking sorted parcels without interfering with the use of the user's hands for sorting parcels.

11 Claims, 4 Drawing Sheets

METHOD AND APPARATUS FOR COMPUTER ASSISTED SORTING OF PARCELS

BACKGROUND OF THE INVENTION

This invention relates to the sorting of parcels, packages, pieces of mail and the like. In particular, it relates to a method and apparatus for sorting parcels, packages, pieces of mail and the like using a portable computer worn by the user and equipped with voice recognition systems and voice synthesis systems so that the sorting process is efficient and accurate.

Hereinafter the term "parcels" shall be used to refer to parcels, packages, pieces of mail and the like. The sorting of parcels by parcel delivery services and similar entities is highly labor intensive and subject to human error. Typically, parcels destined for delivery in a particular locality must be sorted according to the particular delivery driver who is responsible for making the actual deliveries of each parcel to a particular street address. Sorting commonly relies upon the memory of the person responsible for sorting the parcels into bins or similar mechanisms for each delivery driver. The person responsible for carrying out the sorting must receive intensive training which may require the memorization of hundreds or even thousands of addresses associated with each delivery driver and each delivery route. The time lost in such training obviously reduces the cost effectiveness of the operation but, more importantly, such a system relies totally on the ability of the person carrying out the sorting operation to be quick and accurate in the sorting process. If that person cannot recall how to sort a particular parcel, then time is lost in preparing the parcels for delivery and all subsequent delivery schedules are delayed. A worse problem occurs if a parcel is inappropriately sorted. Such an error may require parcels to be resorted or may result in considerable delay. A parcel carried on the wrong route may necessitate either redelivery on a subsequent day or an extra trip by a delivery driver to ensure delivery of the parcel on the same day.

Various techniques have been suggested for improving the process of sorting parcels and the like. For example, U.S. Pat. No. 4,509,635 discloses a sorting system for generally flat articles comprising a number of receptacles mounted on a conveyor which are angularly displacable about an axis between two positions in which a discharge outlet is positioned on opposite sides of a conveyor. While this patent is primarily directed to a system of sorting bins, it also mentions encoding the address of a package by means of a voice recognition system.

Other patents in which voice recognition plays a role in sorting mail or parcels includes U.S. Pat. No. 4,921,107 issued to Hofer on May 1, 1990 for "Mail Sortation System." Hofer discloses a mail sorting system which has a data base of names and associated mail drops. The operator inputs address information to the system either through a keyboard or by means of voice recognition equipment. Hofer also discloses a variation in which the computer requests additional information from the operator until a specific mail drop is identified. Somewhat related is U.S. Pat. No. 4,556,944 issued to Daniels, et al. on Dec. 3, 1985 for "Voice Responsive Automated Mailing System." Daniels discloses a parcel mailing system in which a voice recognition subsystem is trained to recognize various operator words and to generate information such as zone information, zip code information and rate classifications.

Since parcel sorting is often carried out in an environment which places a premium on the mobility of the user, it is desirable for any computer assisted parcel sorting system to be entirely portable. None of the patents cited above disclose parcel sorting systems in which a portable computer is employed. U.S. Pat. No. 5,305,244 issued to Newman, et al. on Apr. 19, 1994 for "Hands Free, User Supported Portable Computer" discloses a compact, self-contained portable computing apparatus. The computing apparatus includes a voice recognition module for receiving audio commands from the user. The computing apparatus further includes a display for receiving information from the computer processor and for displaying the received information to the user. An alternative embodiment is described in which the computer communicates with the operator by sending messages in audio form to the operator via a headset speaker. Newman does not, however, disclose the use of the portable computer apparatus in parcel sorting nor does it disclose the particular adaptations of hardware and software required to adapt a portable computer apparatus to parcel sorting.

The adaptation of a computer system having voice recognition and voice synthesis means to a purpose somewhat analogous to parcel sorting is disclosed in U.S. Pat. No. 5,263,118 issued to Cornelison on Nov. 16, 1993 for "Parking Ticket Enforcement System." Cornelison discloses a parking ticket enforcement system in which a police officer is provided with a hand held communication device. The communication device communicates with a remote computer having a data base of stored vehicle license plate numbers and violation information associated with the license plate numbers. The officer speaks through the communicator and the computer through voice recognition circuitry identifies the license number spoken by the police officer. The license number is matched up with violation information which is then returned to the police officer through voice synthesizing circuitry. Cornelison does not disclose a portable computer but instead uses a large standalone computer which communicates with the user through a hand held radio unit.

It is an object of the present invention to provide for a computer assisted parcel sorting apparatus which through voice recognition and voice synthesis systems substantially frees up the hands of the user for sorting activities.

It is another object of the present invention to provide for a computer assisted parcel sorting system which is entirely portable and which provides complete freedom of motion for the user by mounting the computer and associated apparatus on the user.

It us a further object of the present invention to provide for such a system which provides prompting to the user to ensure accurate parcel sorting.

It is another object of the present invention to provide for laser scanning of bar code labels as an alternative to audible input by the operator.

It is another object of the present invention to provide for a method of generating a data base of addresses from a mail sorting system so as to allow computer dispatching or the generation of optimized route schedules.

It is a further object of the present invention to provide for a method and apparatus to mark sorted parcels without encumbering the hands of the user.

BRIEF SUMMARY OF THE INVENTION

The above objects are achieved and the disadvantages of the prior art are overcome by means of the method and apparatus of the present invention wherein a portable computer capable of both voice recognition and voice synthesis is carried on the body of the user, typically attached to the user's belt. The portable computer is electrically connected to a headset having at least one microphone and at least one speaker. By the method of the present invention, the user reads the street name, zip code or similar information from the address on a parcel. The voice recognition means recognizes the address, compares it to a stored list of bins into which the parcels must be sorted and responds to the user with a description of the particular bin into which the parcel should be placed. Typically the user would only need to read out the street name to the computer for the computer to identify a particular bin associated with a particular route and delivery driver into which the package should be placed. If the computer requires additional information, such as the street number, the computer prompts the user to supply that information.

The procedure outlined above is typical of the final sorting of parcels for delivery to a final destination. The present invention is also usable for the sorting of parcels at hubs for delivery to another sorting point for final delivery. In the case of sorting at a hub, only the ZIP code is normally required.

If the user fails to speak the information correctly or distinctly enough for the computer to recognize the information given by the user, the computer prompts the user to repeat or spell out the street name or other unrecognizable information. Since the voice recognition means is only be required to recognize a limited number of street names or other pieces of information, the voice recognition means can be set to recognize a wide variety of pronunciations and thus is not limited to a single specific user. Likewise, the voice synthesis portion of the system is only required to speak a limited set of sounds to identify particular bins, routes or delivery drivers and to provide specific prompt messages.

An alternative embodiment of the present invention provides for laser scanning means to be incorporated into the portable computer for reading information encoded on a bar code label affixed to a parcel. In particular, a laser scanning head is affixed to the headset and oriented so that the laser scanning beam is focused to a point approximately 2 to 3 feet away from the user. The user then picks up a parcel which would naturally be held in a position for easy reading by the user. In such a position, the laser scanner is positioned so that upon an oral command by the user, such as "scan", the laser scanner is activated to scan the bar code label and automatically enter the encoded information into the computer. A successful scan is announced to the user by the computer using the voice synthesis means. Typically, the bar code contains tracking information or information related to special customer services, such as special billing arrangements, which is not directly required for sorting. If, however, the bar code encodes address information, the remainder of the method of the present invention involving matching the street name to a particular bin and delivering that information to the user would remain the same.

In another alternative embodiment of the present invention, the street information generated upon sorting of each parcel is compiled into a data base. The data base then provides the input information to a route optimization procedure. Such route optimization procedures are known in the art and general purpose routing procedures are readily available in the form of computer software. The output of the route optimization procedure is provided to individual delivery drivers to ensure that deliveries are optimally organized for greatest efficiency.

Another alternative embodiment of the present invention provides for means for marking sorted parcels. As each parcel is sorted and placed in a particular bin for delivery, it is a common and desirable practice to place a mark upon the parcel to show that it has been through the sorting process. Such a mark is typically applied manually by the person carrying out the sorting process. Typical manual marking instruments are easily lost and in addition require the use of at least one of the user's hands. Since one of the objects of the present invention is to leave the user's hands as free as possible to allow for maximum speed and efficiency in the sorting process, use of a manual marking instrument is incompatible. To overcome this problem an alternative embodiment of the present invention provides for a marking instrument clipped to a finger of the user. The marking instrument is disposed at such an angle that it does not interfere with normal use of the operator's hands. When marking is required, however, the user may place the marking instrument in the appropriate position for marking a parcel simply by curling the fingers or by closing that hand into a fist.

Other objects and advantages of the present invention will be apparent to those skilled in the art from consideration of the appended detailed descriptions of the preferred embodiments in conjunction with the drawings as described below.

DETAILED DESCRIPTION OF THE PREFERRED EMBODIMENTS

Figure 1:
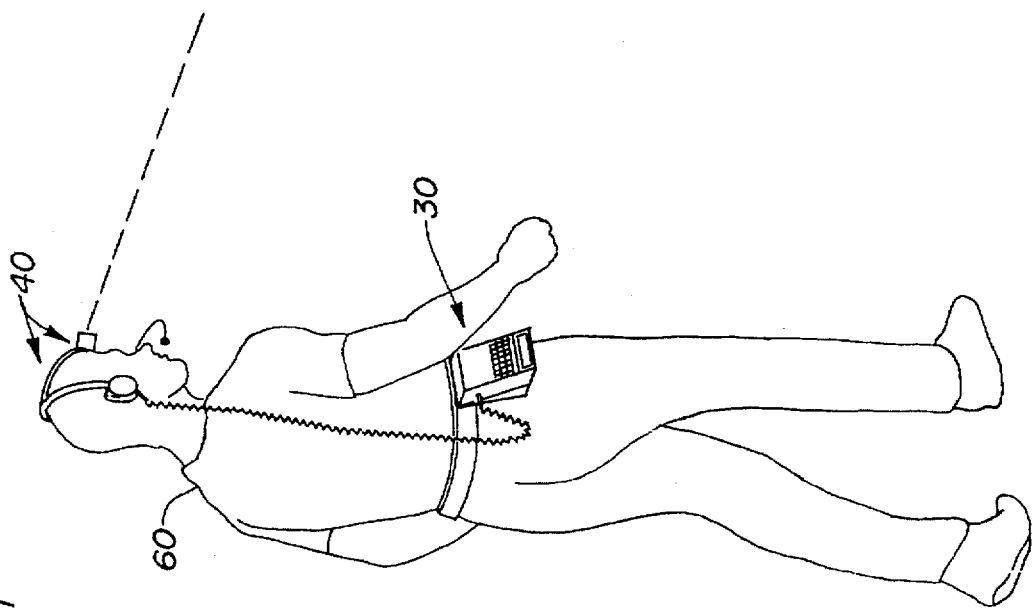
FIG. 1 is a schematic view of a user wearing the apparatus of the present invention.

FIG. 1 is a schematic view of a user wearing the apparatus of the present invention. The apparatus of the present invention comprises a (1) portable computer 30 supported on the body of the user 60 such that the hands of the user 60 are left free during operation of the unit and (2) a headset 40 carried on the head of the user 60 by means of a headband 41 of conventional type. The portable computer 30 is carried on the body of the user 60 in such a manner that the hands of the user 60 are left free for handling parcels. The portable computer 30 will typically be carried on the belt of the user 60 although other methods of carrying the portable computer 30 are considered to be included within the scope of the present invention. The portable computer 30 is electrically connected to the headset 40 as may be seen with reference to FIG. 2. The electrical connection between the portable computer 30 and the headset 40 is a coil type electrical cord 46 in the preferred embodiment. Other forms of electrical connection between the portable computer 30 and the headset 40 could be used, for example, wireless infrared communication.

Figure 2:
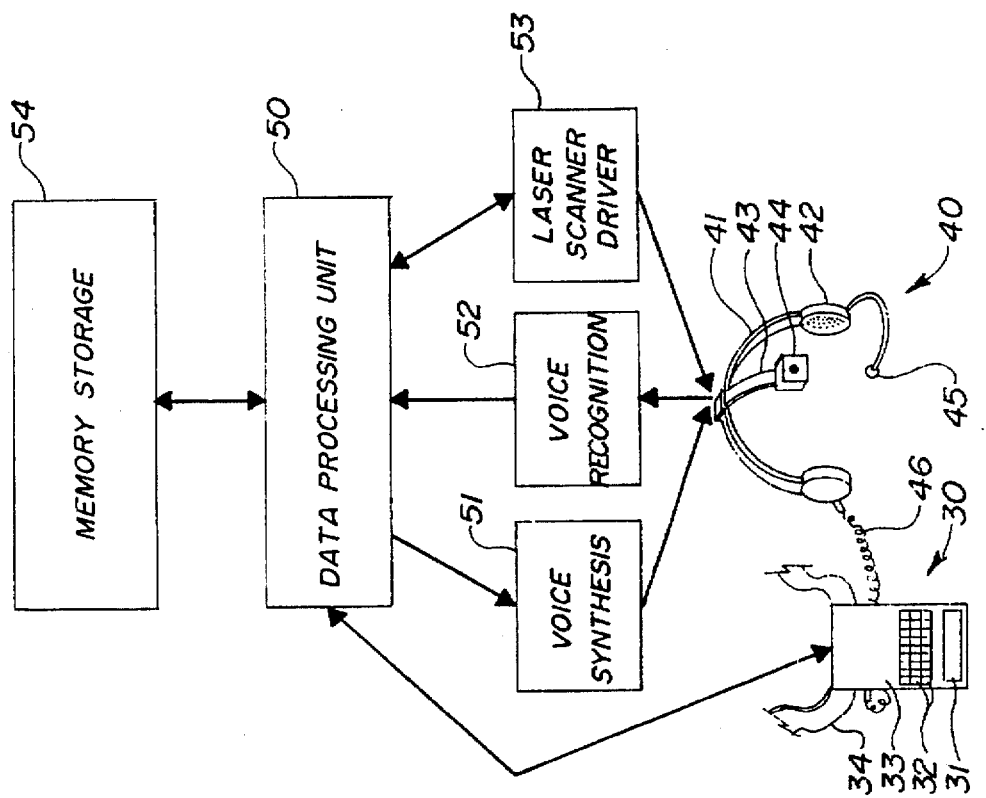
FIG. 2 is a block diagram of the present invention.

Again, with reference to FIG. 2 the portable computer 30 comprises a case 33 having an input key pad 32 for manual input of data to the portable computer 30. Furthermore, the portable computer 30 is provided with a visual display 31 for providing information to the user 60 in circumstances where audio output through the headset 40 is not possible. The visual display 31 may be a digital liquid crystal display or any type of visual display providing alphanumeric information. As noted above, the portable computer 30 in the preferred embodiment is mounted on the body of the user 60 by means of a belt 34.

The case 33 contains a data processing unit 50, memory storage 54, voice synthesis circuitry 51, voice recognition circuitry 52 and a laser scanner driver 53. Means are provided for communication of data between the data processing unit 50 and memory storage 54. The memory storage 54 stores the computer program instructions (the software) for carrying out the functions of the invention; for example, the software to operate the voice synthesis circuitry 51, the voice recognition circuitry 52, the laser scanner driver 53, and to match street addresses against a stored data base of street addresses. In addition, the data processing unit is electrically connected to the visual display 31 and keypad 32 for the transmission of data to and from the data processing unit 50. Furthermore, the data processing unit 50 is provided with means for exchanging data and electrical signals with the laser scanner driver 53 as will be described in more detail below. Means are also provided between the data processing unit 50, the voice synthesis circuitry 51 and the voice recognition circuitry 52 for the transmission of data and electrical signals for generating voice output and recognizing voice input.

The voice synthesis circuitry 51, voice recognition circuitry 52 and laser scanner drive 53 are electrically connected with the headset 40. In particular, the voice synthesis circuitry provides audible information through speakers 42 on the headset 40 to the user 60 and receives audible input from the user 60 through a microphone 45 on the headset 40.

The laser scanner driver 53 described above may not be required for all applications. Where the laser scanner driver 53 is required, it is electrically connected to a laser scanner head 44 mounted to the headset 40 by means of a projection 43 such that the laser scanner head 44 is able to generate a laser scanning beam to scan bar code labels on a parcel held by the user 60 at a convenient viewing distance and angle. The technology of laser scanners is well known in the art. Likewise, voice recognition and voice synthesis may be accomplished by any of a number of commercially available hardware and software packages.

Figure 3:
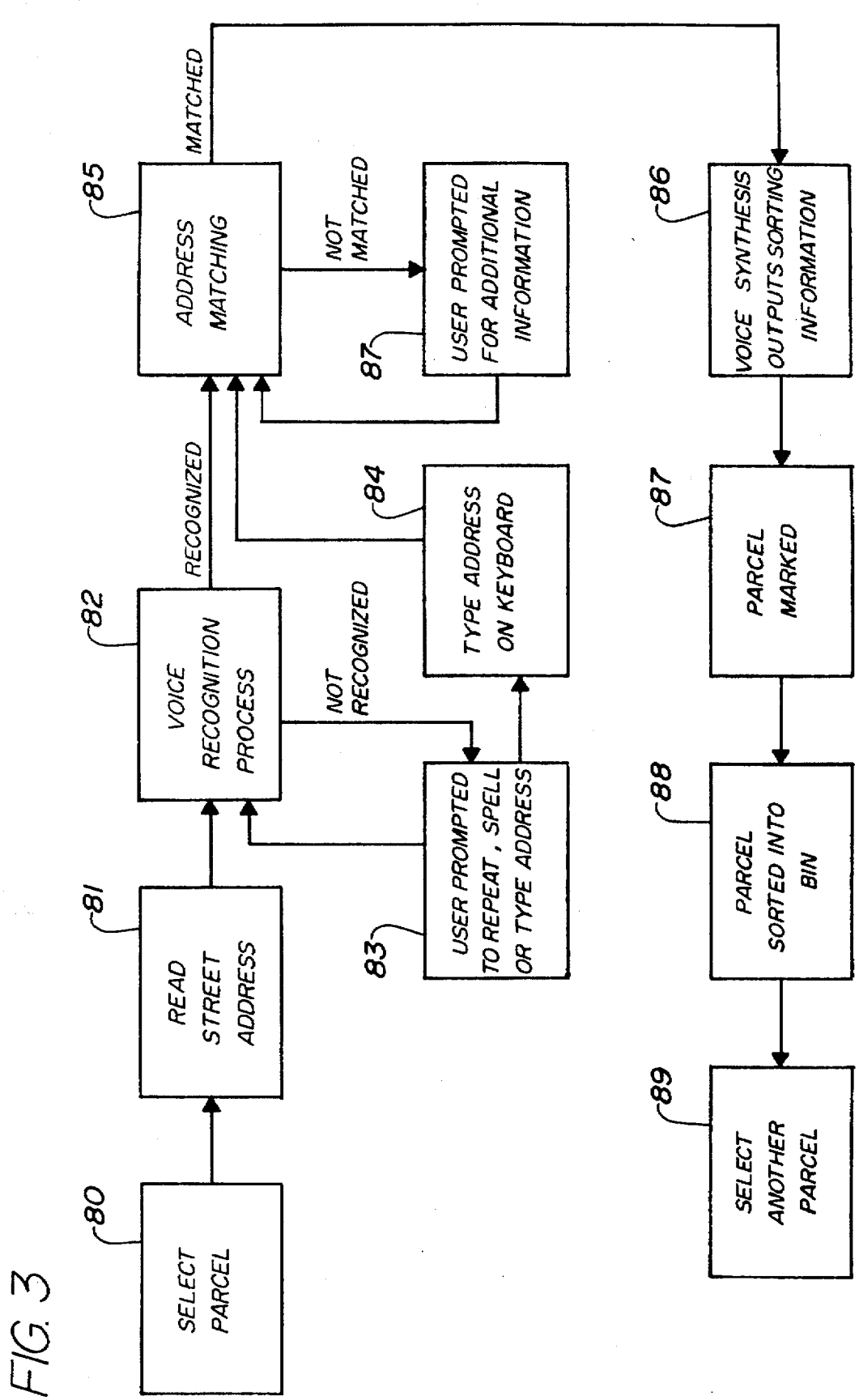
FIG. 3 is a flow chart of the method of the present invention using voice input of street addresses.

The method by which the apparatus of the present invention is employed to assist in the sorting of parcels is described with reference to FIG. 3. The user 60 first selects a parcel 80 and reads the street address 81 (typically only the street name would be required). The audio input of the street address is picked up by the microphone 45 and fed to the voice recognition circuitry 52 as shown in step 82 of FIG. 3. If the street address is not recognized, the user 60 is prompted to repeat the street address, to spell the street address, or to manually enter the street address using the keypad 32 as shown in step 83. This process may be repeated until voice recognition has been achieved. The system may, however, default to manual entry of the street address if the voice recognition process fails as shown in step 84. In either case, the street address is made available to the data processing unit 50 in order to match the street address against a database of known street addresses loaded into the memory storage 54. Programming of the data processing unit 50 to load or update the data base of street addresses or to otherwise change the software may be carried out from a stand-alone computer, such as a lap-top PC. If the street address is matched against the database as shown in step 85, the voice synthesis circuitry 51 provides audible information to the user 60 through the speakers 42 as shown in step 86 on FIG. 3. If the street address is not matched, the user 60 will be prompted for additional information through the voice synthesis circuitry as shown in step 87.

Typically the street address will be matched against a given delivery route. The sorting information provided by the system may include a route identification, the name or other identification of the driver, or may simply provide codes for sorting the parcel into a particular bin or receptacle from which the sorted parcels will be delivered to the appropriate delivery vehicle. For example, the bins may be color coded for particular routes. If Main Street is on the route of Driver A, and Driver A's route is coded "Blue" bin, the sequence of events would be: (1) user 60 picks up parcel, (2) states "Main," (3) "Main" is recognized as a street on Driver A's route, (4) Driver A's route is matched with bin "Blue," (5) word "Blue" is generated and presented to user 60 through speaker 42, and (6) user 60 places parcel in the "Blue" bin.

Once the parcel has been matched with a particular delivery route, the parcel must typically be marked to indicate that sorting has been accomplished. This is often done manually using a crayon or fiber-tip type of marking utensil. The parcel may then be sorted into a bin and the user 60 may select another parcel as shown in steps 87 through 89 on FIG. 3.

An alternative embodiment of the present invention contains an enhancement for optimizing delivery routes. Since the address of each parcel sorted to a particular driver may be entered into memory storage 54, this data may be compiled into a data base for input to a route optimization software program. Route optimization software is readily obtainable commercially and could be loaded onto a stand-alone computer. The data base compiled by the portable computer 30 may then be downloaded into the stand-alone computer for route optimization. Each delivery driver is then provided with an optimized route schedule for delivery of the sorted parcels.

Figure 4:
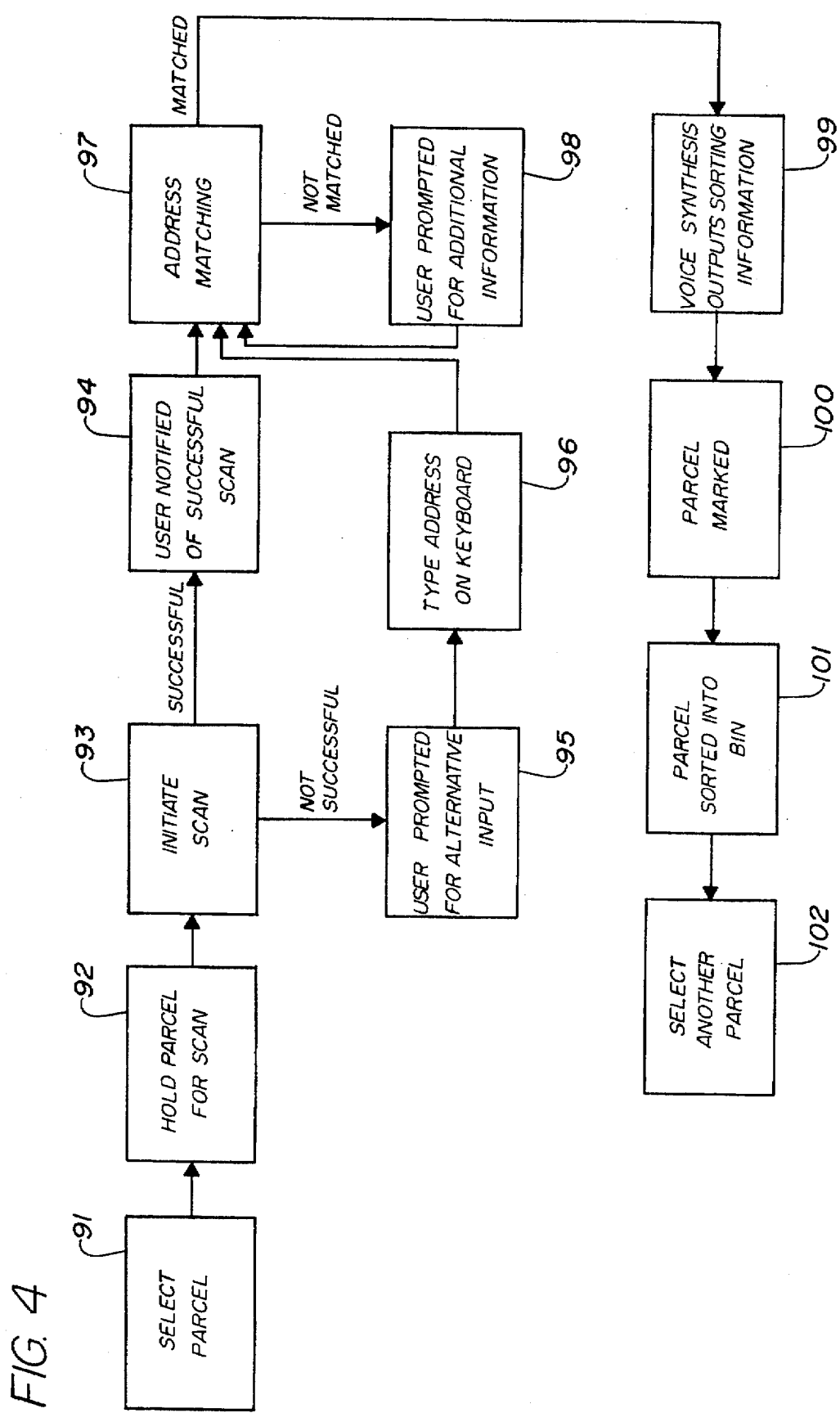
FIG. 4 is a flow chart of the alternative method of the present invention using laser scanning of bar code labels for input of street addresses.
Figure 5:
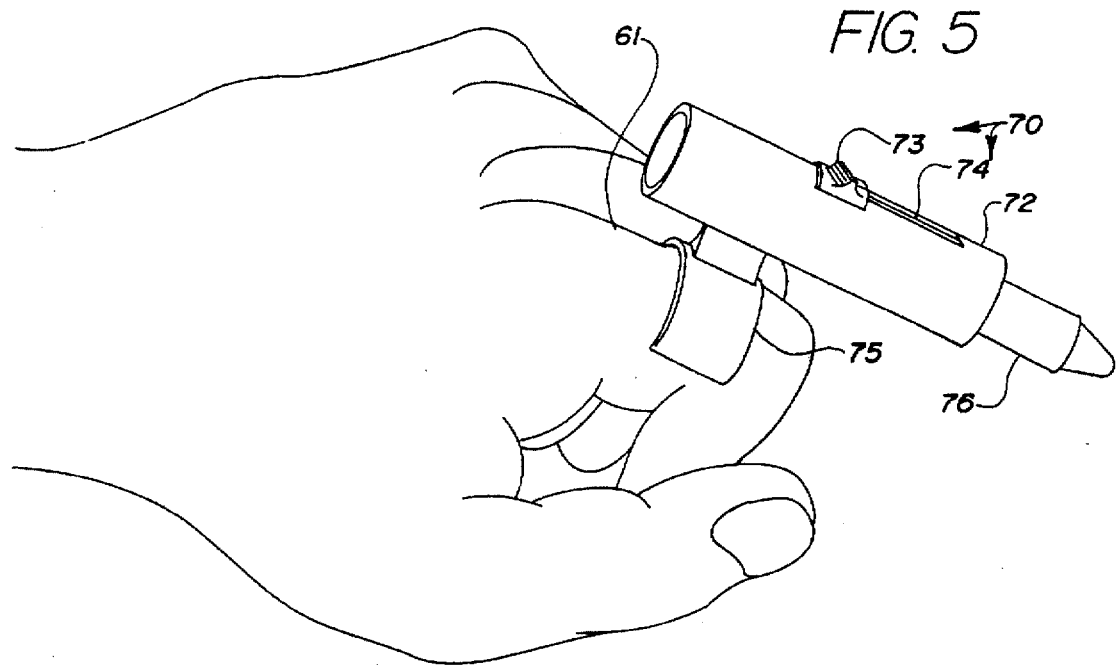
FIG. 5 is a view of the marking instrument used in conjunction with the apparatus and method of the present invention.
Figure 6:
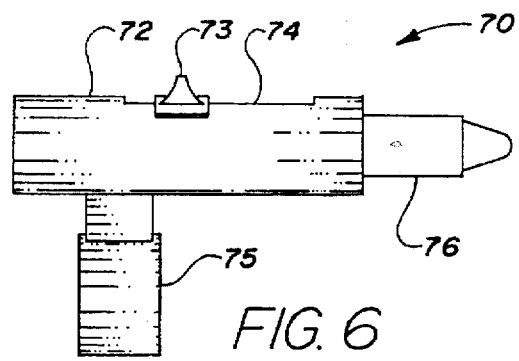
FIG. 6 is a right elevation view of the marking instrument of FIG. 5.
Figure 7:
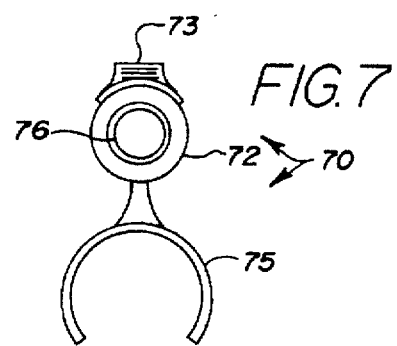
FIG. 7 is a front elevation view of the marking instrument of FIG. 5.
Figure 8:
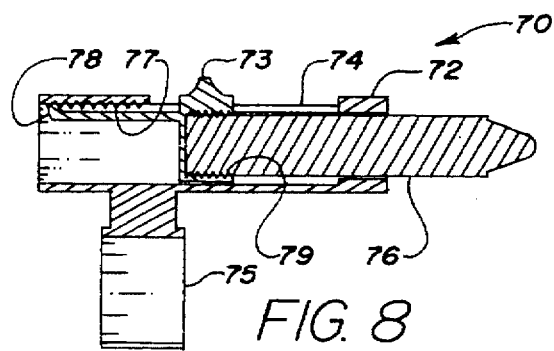
FIG. 8 is a cross sectional view of the marking instrument of FIG. 5.

Another alternative embodiment of the present invention is described with reference to FIG. 4. In this alternative embodiment, the parcels to be sorted have been previously supplied with a bar code label which may be scanned by a laser scanner. The bar code label may contain address information. The address information on a bar code label may be scanned by having the user 60 select a parcel which is held at a comfortable angle and distance for reading by the user. At such a position, the laser scanner head 44 may be adjusted to provide scanning of the bar code label for street address or other information. The user initiates the scan by voice input, for example, the user may say "scan." The voice recognition circuitry 52 recognizes the command word and through the data processing unit 50 controls the laser scanner driver 53 to initiate the scanning process. If the coded information on the bar code label is successfully returned through the laser scanner to the data processing unit 50, the user is notified of the successful scan as shown in steps 91 through 94 of FIG. 4. If the scan is not successful, the user 60 may be prompted for an alternative means of inputting information such as manual entry of data through the keypad 32 as shown in steps 95 and 96 of FIG. 4. Alternatively, the user may be prompted for voice input of the street address. Once the address has been successfully inputted to the data processing unit 50, the steps of address matching and sorting of the parcel as shown in steps 97 through 102 of FIG. 4 are equivalent to steps 85 through 89 of FIG. 3 as previously described.

While the alternative embodiment of FIG. 4 has been described with reference to the input of street addresses, the system may also be employed for other purposes. For example, bar code labels may contain information other than address information. One possible use for bar code labels other than the input of street address information would be the encoding of special handling information.

As noted above, it is recommended that a parcel be marked after sorting to indicate that the sorting process has been successfully completed. In manual sorting of parcels, the marking instrument is likewise a manual device. The marking instrument may therefore be easily lost. Furthermore, the use of a manual instrument employs the user's hands which is inconsistent with a primary objective of the present invention to free up the operator's hands. If the operator's hands are completely freed up, the operator is able to use his hands solely for the purpose of selecting, placing and moving parcels which provides for a quicker, more efficient operation. Therefore, an additional embodiment of the present invention provides for a crayon holder 70 mounted to a finger 61 of the user 60 such that the hands of the user 60 are otherwise unencumbered by the need to manually hold the crayon 76, as shown with reference to FIGS. 5, 6, 7 and 8.

The crayon holder 70 is provided with a finger clip 75 which fits about a finger 61 of the user 60. The crayon 76 is received within the crayon holder 70 and disposed so that the crayon 76 may be used to mark parcels without interfering with other uses of the user's hand and without the danger of the crayon 76 being lost. In the preferred embodiment of the present invention, the crayon 76 is held by a crayon carrier 79 which is slidably received within a cylinder 72 which is affixed to the finger clip 75. In the embodiment shown in FIGS. 5 through 8, the cylinder 72 is disposed in a plane parallel to the finger 61 when the finger is fully extended. The cylinder 72 may, however, be disposed at angles either above or below that plane for the convenience of the user 60.

An adjustment tab 73 is rigidly affixed to the carrier 79 and protrudes through a slot 74 in the cylinder 72. The user 60 may use the adjustment tab 73 to extend the crayon 76 from the cylinder 72. In order to prevent the crayon 76 from being depressed back into the cylinder 72, a notched extension 77 of the carrier 79 may be employed to act against complementary notches 78 in the cylinder 72 to provide a series of positions at which the crayon 76 may be extended and maintained. Other mechanisms such as biasing springs would accomplish the same purpose as would be readily apparent to those skilled in the art.

The method and apparatus of the present invention has been described with respect to certain preferred and alternative embodiments which are given by way of example and not by way of limitation to the full scope of the present invention as set forth in the appended claims.

What is claimed is:

1. An apparatus for computer assisted sorting by a user of parcels, comprising:

a portable computing unit having means for being removably supported on said user, and further having mounted within said portable computing unit data processing means, memory storage means communicating with said data processing means, voice recognition means communicating with said data processing means for receiving oral utterances by said user and for converting said oral utterances to input electrical signals for communication to said data processing means, matching means associated with said data processing means for matching said input electrical signals against a discrete set of street addresses stored in said memory storage means, response means associated with said data processing means for assigning output electrical signals responsive to said input electrical signals according to current operational context, voice synthesis means communicating with said data processing means for receiving said output electrical signals and converting said output electrical signals to oral responses to said user;

a headset to be worn on the head of said user, said voice recognition means further comprising at least one microphone associated with said headset, and said voice synthesis means further comprising at least one speaker associated with said headset;

wherein said response means provides said oral responses to said user in the form of sorting directions for said parcel;

wherein said response means further provides said oral responses to said user in the form of prompting commands for providing further information by the user to said voice recognition means; and laser scanning means communicating with said data processing means and having a laser scanning head attached to said headset and oriented so as to scan a parcel having a bar coded label when held by said user.

2. The apparatus of claim 1 further comprising means for marking said parcels.

3. The apparatus of claim 2 wherein said means for marking comprises a marking instrument having a clip for attachment to a finger of said user such that said marking instrument is oriented at an angle to a line defined by said finger at full extension.

4. A method for computer assisted sorting by a user of parcels, comprising the steps of:

(a) mounting on the user a portable computing unit having data processing means, memory storage means communicating with said data processing means, voice recognition means communicating with said data processing means for receiving oral utterances by said user and for converting said oral utterances to input electrical signals for communication to said data processing means, matching means associated with said data processing means for matching said input electrical signals against a discrete set of street addresses stored in said memory storage means, response means associated with said data processing means for assigning output electrical signals responsive to said input electrical signals according to current operational context, voice synthesis means communicating with said data processing means for receiving said output electrical signals and converting said output electrical signals to oral responses to said user;

(b) selecting at random a parcel having a street address indicated thereon;

(c) receiving an oral utterance by said user of said street address by said voice recognition means, converting said oral utterance to an input electrical signal, and communicating said input electrical signal to said data processing means;

(d) comparing said input electrical signal to a discrete set of street addresses;

(e) assigning an output electrical signal responsive to said input electrical signal according to current operational context;

(f) communicating said output electrical signal to said voice synthesis means and converting said output electrical signal to an oral response to said user.

5. The method of claim 4, wherein said output electrical signal of step (e) when converted to said oral response of step (f) prompts said user to repeat said oral utterance.

6. The method of claim 4, wherein said output electrical signal of step (e) when converted to said oral response of step (f) prompts said user to spell said street address.

7. The method of claim 4, wherein step (e) comprises assigning an output electrical signal providing sorting directions to said user for said parcel.

8. The method of claim 7, comprising the additional steps following step (f) of marking said parcel to indicate that the parcel has been sorted and placing said parcel in a receiving bin responsive to said sorting directions.

9. The method of claim 4, further comprising the step of repeating the steps of claim 4 for a given quantity of sorted parcels, generating a data base of street addresses of said sorted parcels, and processing said data base to create optimized delivery routes for said sorted parcels.

10. The method of claim 4 further comprising the step following step (a) of mounting on the user laser scanning means communicating with said data processing means and having a laser scanning head oriented so as to scan a parcel having a bar coded label when held by said user.

11. The method of claim 10 further comprising the step, following step (b) of claim 4, of scanning said bar code label, decoding said bar code label to generate an input electrical signal corresponding to the street address of said parcel.

\* \* \* \* \*